United States Patent Office 3,177,199
Patented Apr. 6, 1965

---

3,177,199
WATER-SOLUBLE AZO DYESTUFFS
Guenter Lange, Ludwigshafen (Rhine), Helmut Steuerle, Heidelberg, Rudolf Schroedel and Roland Mueller, Ludwigshafen (Rhine), and Wilhelm Federkiel, Frankenthal, Pfalz, Germany, assignors to Badische Anilin- & Soda-Fabrik Aktiengesellschaft, Ludwigshafen (Rhine), Germany
No Drawing. Filed Dec. 7, 1959, Ser. No. 857,577
Claims priority, application Germany, Dec. 9, 1958, B 51,366; Nov. 14, 1959, B 55,538
5 Claims. (Cl. 260—162)

This invention relates to azo dyestuffs containing at least one ionogenic water-solubilizing group and which contain combined by way of oxygen at least one beta, gamma-dihydroxypropyl radical which is esterified in gamma-position with sulfuric acid or an organic sulfonic acid, and to a process for the production of azo dyestuffs of the said kind.

A special object of the invention is to provide water-soluble azo dyestuffs of the said kind which contain, in the part of the molecule corresponding to the diazo component, a beta,gamma-dihydroxypropyl radical, combined by way of oxygen, which is esterified in gamma-position with sulfuric acid or an organic sulfonic acid, but which contain no sulfonic acid groups, and a process for the production of such dyestuffs.

According to this invention, the new dyestuffs may be obtained either:

(a) By converting azo dyestuffs which contain at least one ionogenic water-solubilizing group and at least one beta,gamma-epoxypropyl radical combined by way of oxygen, or a diazo component thereof which bears corresponding radicals, with the aid of at least a stoichiometrical amount of sulfuric acid or of an organic sulfonic acid to beta,gamma-dihydroxypropyl derivatives esterified in gamma-position and, when diazo components have been used, completing the azo dyestuff in the usual way by diazotisation and coupling to a water-soluble azo dyestuff, or (b) By reacting acylating agents which give off the radical of sulfuric acid with azo dyestuffs or their preliminary products which contain at least one beta,gamma-dihydroxypropyl radical combined by way of oxygen, or reacting acylating agents which give off the radical of a sulfonic acid with azo dyestuffs or their preliminary products which contain at least one ionogenic water-solubilizing group and at least one beta,gamma-dihydroxypropyl radical combined by way of oxygen, to form beta,gamma-dihydroxypropyl derivatives esterified in gamma-position and, when preliminary products have been used, completing the azo dyestuff in the usual way.

The invention relates especially to water-soluble azo dyestuffs of the general formula:

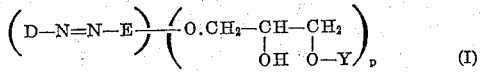   (I)

which contain up to three ionogenic water-solubilizing groups. In the said formula, D represents the radical of a diazo component of the benzene series, E the radical of a coupling component of the benzene or naphthalene series, or the radical of a heterocyclic coupling component, thus for example the radical of a phenolic, naphtholic or enolic coupling component, Y the radical of sulfuric acid or the radical of an organic sulfonic acid, and $p$ one of the numbers 1 and 2.

Suitable ionogenic water-solubilizing groups are especially sulfonic acid groups, carboxyl groups and/or $HO.SO_2.O-$ groups. The benzene nucleus D and the radical E may also carry further substantially neutral substituents such as are usual in the chemistry of azo dyestuffs, as for example, low molecular weight alkyl groups, such as methyl, ethyl or butyl groups, aryl radicals, such as phenyl radicals, low molecular weight alkoxyl groups, such as methoxyl or ethoxyl groups, halogen atoms, such as chlorine or bromine atoms, amino groups which are unsubstituted or may be substituted by one or two low molecular weight alkyl radicals, such as methyl or ethyl radicals, acylamino groups, such as acetylamino or benzoylamino groups, cyano groups, nitro groups, trifluoromethyl groups, sulfonic acid amide groups, carboxylic acid amide groups and alkylsulfone groups. Moreover the radical D or E may contain a further radical of a diazo or coupling component combined by way of an azo group. In this case there are thus present disazo dyestuffs.

Organic sulfonic acids suitable for the esterification are for example methane sulfonic acid, ethane sulfonic acid, vinyl sulfonic acid, beta-chlorethyl sulfonic acid, benzene sulfonic acid, para-toluene sulfonic acid, orthochlorbenzene sulfonic acid, para-chlorbenzene sulfonic acid, meta-nitrobenzene sulfonic acid, naphthalene-2-sulfonic acid and diphenyl-para,para'-disulfonic acid.

The invention therefore relates especially to dyestuffs and to a process for the production of dyestuffs of the general formulae:

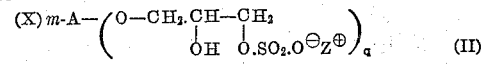   (II)

and

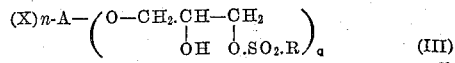   (III)

in which A represents the radical of an azo dyestuff, R an organic radical, for example, an aliphatic or aromatic radical which may be substituted, X an ionogenic water-solubilizing group, $Z^\oplus$ a cationic radical, for example a hydrogen cation, an ammonium cation or an alkali metal cation, such as a sodium or a potassium cation, $m$ one of the numbers 0, 1 and 2, $n$ one of the numbers 1 and 2 and $q$ one of the numbers 1 and 2.

Those water-soluble monoazo dyestuffs obtainable according to this invention which contain in the part of the molecule corresponding to the diazo component, a beta, gamma-dihydroxypropyl radical, combined by way of oxygen, and being esterified in gamma-position with sulfuric acid or an organic sulfonic acid but do not contain either sulfonic acid groups or carboxylic acid groups, are characterized by especially outstanding tinctorial properties. These dyestuffs which contain up to 3 ionogenic water-solubilizing groups, correspond especially to the general formula:

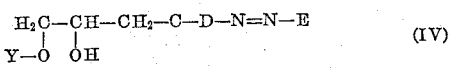   (IV)

in which D represents the radical of a diazo component of the benzene series, E the radical of a coupling component of the benzene or naphthalene series or the radical of a heterocyclic coupling component, thus for example the radical of a phenolic, naphtholic or enolic coupling component, and Y the radical of sulfuric acid or the radical of an organic sulfonic acid.

The production of the new dyestuffs will now be described in greater detail.

We have found that new and valuable azo dyestuffs are obtained when (a) azo dyestuffs which contain at least one ionogenic water-solubilizing group and at least one beta,gamma-epoxypropyl radical combined by way of oxygen, or their diazo components which bear at least one beta,gamma-epoxypropyl radical and, if desired, at least one ionogenic water-solubilizing group, are converted with the aid of at least stoichiometrical amounts of sulfuric acid or an organic sulfonic acid into beta, gamma-dihydroxypropyl derivatives esterified in gamma-position and, when the diazo components have been used, the formation of a water-soluble azo dyestuff is completed in the usual way by diazotization and coupling, if desired with a coupling agent containing at least one water-solubilizing group.

It may be advantageous to combine the action on the above specified diazo components of the sulfuric acid or the organic sulfonic acid with the production of these dyestuff preliminary products. For this purpose, a preliminary product for the diazo component which bears an acylamino group with a hydrogen atom attached to nitrogen and contains at least one hydroxyl group still having a reactive hydrogen atom, is reacted with epihalogenhydrin in the presence of at least the stoichiometrical amount of an alkaline agent to form a beta,gamma-epoxypropyl derivative. From the latter, by the action of sulfuric acid or an organic sulfonic acid, there is then formed therefrom a beta,gamma-dihydroxypropyl derivative esterified in gamma-position and the acyl radical is split off from the amino group. The product thus obtained is converted to a water-soluble azo dyestuff by diazotization and coupling. Provision must be made for the diazo and/or coupling components to contain at least one ionogenic water-solubilizing group.

Examples of suitable organic sulfonic acids are aliphatic or aromatic sulfonic acids, for example para-toluenesulfonic acid, naphthalene-2-sulfonic acid, diphenyl-para,para'-disulfonic acid or methylsulfonic acid, and examples of ionogenic water-solubilizing groups are especially sulfonic acid and/or carboxylic groups.

The production of the new azo dyestuffs by the reaction of dyestuff preliminary products with sulfuric acid or with organic sulfonic acids is of special interest. It is however also possible to treat the finished azo dyestuffs, for example mono- or diazo dyestuffs, which contain at least one beta,gamma-epoxypropyl radical, with the above-mentioned acids.

Depending on the nature of the acid used, the above-mentioned acids are allowed to act on the dyestuff preliminary products or on the finished azo dyestuff at temperatures between —20° and +120° C., temperatures between +10° and +30° C. being preferable. It is preferable to start from stoichiometrical amounts of the reactants. Depending on the nature of the above-mentioned acids, it may also be advantageous to use the acid in excess. The above-mentioned acids may act on the beta,gamma-epoxypropyl compounds in the absence or preferably in the presence of solvents and/or diluents. As solvents and/or diluents there are suitable for example water or organic agents such as tetrahydrofurane, ethyl acetate or acetic acid, or low molecular weight alcohols, as for example methanol or ethanol, or low molecular weight ketones, as for example acetone or also mixtures of these substances.

Diazo components which contain at least once a beta, gamma-epoxypropyl radical combined by way of oxygen may be prepared by using as initial materials amino benzenes which have been acylated, especially acetylated or formylated, on the amino group. By reacting this type of compound which contains at least one hydroxyl group with epihalogenhydrins, as for example 1-chlor-2,3-epoxypropane or 1-brom-2,3-epoxypropane, in the presence of at least a stoichiometrical amount of an acid-binding agent, there is obtained a beta,gamma-epoxypropyl compound which by treatment with any one of the said acids and by hydrolytic splitting off of the acyl radical is converted into the corresponding beta,gamma-hydroxypropyl derivative esterified in the gamma-position and containing a diazotizable amino group.

For the adding-on to aromatic compounds of the epihalogenhydrins in the presence of at least the stoichiometrical amount of acid-binding agent, as for example to compounds of the benzene series, it is preferable to work at temperatures between 10° and 100° C. It is advantageous to start from stoichiometrical amounts of the reactants, or the epihalogenhydrins and/or the acid-binding agents are used in excess. The epihalogenhydrins are advantageously added on in the presence of solvents, for example water or alcohols, such as methanol or ethanol, or mixtures of alcohols with water.

An interesting varient of the procedure consists in first reacting hydroxy-nitrobenzenes with epihalogenhydrins in the presence of at least a stoichiometrical amount of acid-binding agent and subsequently reducing the nitro groups to primary amino groups in order to obtain diazo components suitable for the process according to the present invention. In this way there may be obtained for example the derivatives of beta,gamma-dihydroxypropyl-4-aminophenyl ether esterified in gamma-position with sulfuric acid, alkylsulfonic acids or arylsulfonic acids, as well as the corresponding isomers in which the amino and ether groups are in ortho- or meta-position to one another.

If the starting materials for the process according to this invention are aromatic or aliphatic disulfonic acids, two diazo components can be combined and valuable diazo components obtained having the general formula:

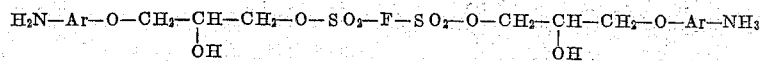

in which Ar represents an aromatic radical and F an alkyl or aryl radical.

We have further found that new valuable azo dyestuffs containing at least one ionogenic water-solubilizing group are obtained when (b) an acylating agent which gives off the radical of sulfuric acid is reacted with an azo dyestuff or a preliminary product thereof which contains at least one beta,gama-dihydroxypropyl radical, or when an acylating agent which gives off the radical of an organic sulfonic acid is reacted with an azo dyestuff which contains at least one ionogenic water-solubilizing group and at least one beta,gamma-dihydroxypropyl radical combined by way of oxygen or a preliminary product of the same which contains at least one beta,gamma-dihydroxypropyl radical combined by way of oxygen and if desired at least one ionogenic water-solubilizing group, to form beta,gamma-dihydroxypropyl derivatives esterified in gamma-position, and, when the preliminary products have been used, the azo dyestuff containing at least one ionogenic water-solubilizing group is completed in the usual way.

When using azo dyestuff preliminary products it is often advantageous to combine the action of the acylating agents with the production of the said azo dyestuff preliminary products. For this purpose a preliminary product for a diazo or a coupling component which contains an acylamino group with a hydrogen atom combined with nitrogen and at least one phenolic hydroxyl group is converted in the usual way into a beta,gamma-dihydroxypropyl derivative. From the latter, the acyl group is split off from the amino group with the aid of aqueous sulfuric acid and then by concentrating the sulfuric acid, a beta,gamma-dihydroxypropyl derivative esterified in gamma-position is prepared in one operation. The product thus obtained is completed to form a water-soluble azo dyestuff by diazotization and coupling or by coupling.

Monoazo and disazo dyestuffs are especially suitable as azo dyestuffs. Acylating agents which give off the radical of sulfuric acid or the radical of an organic sulfonic acid are for example sulfuric acid, alkylsulfonic acids, such as low molecular weight saturated or unsaturated alkylsulfonic acids, and arylsulfonic acids, such as arylsulfonic acids which contain up to two 5- or 6-membered rings, in the form of free acids or their derivatives, such as their halides or their anhydrides. The following acylating agents of the above-mentioned kind may be given by way of example: methane sulfonic acid chloride, vinyl sulfonic acid chloride, beta-chlorethylsulfonic acid chloride, benzenesulfonic acid chloride or bromide, para- or ortho-chlorbenzenesulfonic acid chloride, para-toluenesulfonic acid chloride or bromide, meta-nitrobenzenesulfonic acid chloride, para-toluenesulfonic acid anhydride, chlorsulfonic acid, sulfuric acid, and also its acid sulfates, such as potassium hydrogen sulfate, and pyrosulfates, such as potassium or sodium pyrosulfate.

The azo dyestuffs and their preliminary products, such as diazo components and coupling components, which have at least one beta,gamma-dihydroxypropyl radical combined by way of oxygen, serving as initial materials for the new process are obtainable by reaction of azo dyestuff preliminary products, such as diazotized amines or compounds capable of coupling, which contain reactive phenolic hydroxyl groups, with agents which give off the radical of the formula

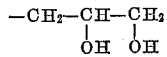

in the usual way. Agents of this last-mentioned kind are for example 1-chlor-2,3-dihydroxypropane, glycide or glycerin. The diazotizable amines or compounds capable of being coupled thus reacted are if necessary completed to the azo dyestuff by diazotization and coupling or by coupling in the usual way.

As azo dyestuff or their preliminary products which have at least one beta,gamma-dihydroxypropyl radical, combined by way of oxygen, the following compounds may be given as individual examples:

(1) 4-aminophenyl-(beta,gamma-dihydroxypropyl) ether
(2) 3-aminophenyl-(beta,gamma-dihydroxypropyl) ether
(3) 2-aminophenyl-(beta,gamma-dihydroxypropyl) ether
(4) 2-chloro-5-aminophenyl-(beta,gamma-dihydroxypropyl) ether
(5) 2,4-dichlor-5-aminophenyl-(beta,gamma-dihydroxypropyl) ether
(6) 4-methyl-5-aminophenyl-(beta,gamma-dihydroxypropyl) ether
(7) 2-methoxy-5-aminophenyl-(beta,gamma-dihydroxypropyl) ether
(8) 3-nitro-6-aminophenyl-(beta,gamma-dihydroxypropyl) ether
(9) 3-methylsulfonyl-4-aminophenyl-(beta,gamma-dihydroxypropyl) ether
(10) N-(2-hydroxynaphthoyl-3)-4-aminophenyl-(beta,gamma-dihydroxypropyl) ether
(11) N-(1-hydroxy-3-sulfonaphthyl-6)-4-aminophenyl-(beta,gamma-dihydroxypropyl) ether (obtainable by the process of British patent specification No. 33,573)
(12) N-(1-hydroxy-3-sulfonaphthyl-7)-4-aminophenyl-beta,gamma-dihydroxypropyl) ether
(13) 2-aminophenylene-1,4-bis-(beta,gamma-dihydroxypropyl) ether
(14) The azo dyestuff derived from diazotised 4-aminophenyl-(beta,gamma-dihydroxypropyl) ether and beta-naphthol
(15) The azo dyestuff derived from diazotized 3-aminophenyl-(beta,gamma-dihydroxypropyl) ether and 1-phenyl-3-methyl-pyrazolone-(5)

Since the primary hydroxyl group present in gamma-position in the beta,gamma-dihydroxypropyl ethers differs from the secondary hydroxyl group present in beta-position by its considerably greater reactivity, there are obtained by esterification with one equivalent of acid for each beta,gamma-dihydroxypropyl ether group, almost exclusively the beta,gamma-dihydroxypropyl derivatives esterified in gamma-position. Any compounds of the beta,gamma-dihydroxypropyl ether series esterified in the beta-position which may also be formed in small amounts by the esterification are not injurious because the azo dyestuffs of this series have similar value to the corresponding beta,gamma-dihydroxypropyl derivatives esterified in gamma-position. The corresponding azo dyestuffs which are derived from beta,gamma-dihydroxypropyl ethers esterified in both beta- and gamma-position are however of lower tinctorial value. The acylating agents which provide the radical of sulfuric acid or the radical of an organic sulfonic acid are therefore preferably used in stoichiometrical amounts with up to 10% excess for the esterification of the azo dyestuffs or azo dyestuff preliminary products having at least one beta,gamma-dihydroxypropyl radical combined by way of oxygen.

The esterification takes place in the presence or absence of solvents and/or diluents as a rule at temperatures between 0° and 160° C. and at atmospheric or reduced pressure, possibly in the presence of acid-binding agents. As solvents and/or diluents there may be used for example tertiary amines, such as pyridine, amides, such as N,N-dimethylacetamide, lactams, such as N-methylpyrrolidone, ethers, such as dioxane, esters, such as ethyl acetate, methyl propionate or normal-butyl acetate, chlorinated hydrocarbons, such as di- and tri-chlorethylene or tetrachlorethane, or simple benzene derivatives, such as toluene, chlorbenzene or trichlorbenzene. Examples of suitable acid-binding agents are inorganic substances, such as sodium acetate, potassium acetate or sodium bicarbonate, and organic substances, such as pyridine, quinoline, N,N-dimethylformamide or N-methylpyrrolidone.

The following is a detailed description of methods of carrying out the esterification, given by way of example: An azo dyestuff which has the grouping

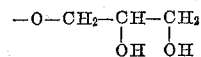

is dissolved in anhydrous pyridine or N-methylpyrrolidone and the calculated amount of chlorsulfonic acid or the calculated amount of the adduct of chlorsulfonic acid with dioxane dissolved in dioxane at 0° to +5° C. is allowed to flow in slowly, or a dyestuff preliminary product, such as 4-aminophenyl-(beta,gamma-dihydroxypropyl) ether, is dissolved together with the calculated amount of sulfuric acid in water and the solution heated in vacuo at 100° to 160° C. until all the water has been removed. In the production of dyestuff preliminary products which have a primary amino group and contain at least one beta,gamma-dihydroxypropyl radical combined by way of oxygen, for example in the production of 4-aminophenyl-(beta,gamma-dihydroxypropyl) ether from 4-acetylaminophenol, the corresponding N-acyl derivative is often first obtained. In this case therefore the splitting off of the acyl radical and the esterification of the beta,gamma-dihydroxypropyl groups in gamma-position with sulfuric acid can be carried out in one and the same operation.

The deystuffs obtainable according to this invention are suitable for dyeing and/or printing structures, such as foils, films and textile materials, for example fibers, threads, flocks, woven and knitted fabrics, of natural and/or synthetic substances containing carbonamide groups, such as leather, wool, natural silk or linear polyamides, as for example polycaprolactam or linear condensation products of adipic acid and hexamethylene diamine. The new deystuffs are, however, suitable in an especially remarkable way for the fast dyeing and/or printing of structures of the aforesaid kind of native and/or regenerated cellulose, such as cotton, linen, viscose rayon, hemp or jute.

The procedure in dyeing with the new dyestuffs may be for example that textile material of cellulose is padded with a solution of the dyestuffs according to this invention if necessary with an addition of electrolytes and, preferably after drying, led through a bath which contains an alkaline reagent such as sodium hydroxide or carbonate or bicarbonate or potassium hydroxide or carbonate and preferably an electrolyte, the dyestuff then being fixed on the fiber by short steaming. A treatment with air at temperatures between 20° and 200° C., preferably at 70° to 130° C., may be used instead of the steaming. The alkaline reagents may however also be added to the padding bath. Furthermore it is possible to dye with the dyestuffs with the addition of alkaline reagents and possibly of electrolytes, for example sodium chloride or sodium sulfate, at 20° to 30° C. and to fix the dyestuffs by gradually increasing the bath temperature. Finally the cellulose textile material may be pretreated with an alkaline reagent, dried and they dyed with a dyestuff of the said kind and thereafter fixed.

In the printing of cellulose structures, the dyestuffs are advantageously applied to the fiber together with a thickening agent, such as sodium alginate or tragacanth, possibly with one of the usual printing auxiliaries and an alkaline reagent and dried at temperatures between 20° and 200° C., preferably between 50° and 105° C., or steamed for a short time. The dyestuff together with a thickening agent and one of the usual printing auxiliaries may also be printed onto the fabric, dried, the fabric led through a bath charged with alkaline reagent and then dried at temperatures between 20° and 200° C. or steamed at 105° C. Finally, as in the case of dyeing, a fabric treated with alkaline reagent may be printed with the dyestuff together with thickening agent and printing auxiliary and then dried or steamed.

The following examples will further illustrate this invention but the invention is not restricted to these examples. The parts specified in the examples are parts by weight.

Example 1

A solution of 100 parts of 1-formylamino-2-methyl-5-hydroxybenzene and 30 parts of sodium hydroxide in 1000 parts of water is mixed with 100 parts of epichlorhydrin and stirred for 5 hours at room temperature. A brown oil thereby separates and is washed with water. An equal volume of methanol is added thereto and the mixture stirred for 2 to 3 hours. The 2,3-epoxypropyl-(3-formylamino-4-methyl-phenyl) ether crystallizes in the form of fine crystal leaflets which are filtered off by suction and washed with a little methanol.

Into a solution of 17.2 parts of 1-methylbenzene-4-sulfonic acid in 50 parts of acetone there are then introduced 21 parts of 2,3-epoxypropyl-(3-formylamino-4-methyl-phenyl) ether, the preparation of which is described in the preceding paragraph. The epoxide which of itself is difficultly soluble in acetone, thereby passes into solution because the corresponding sulfonic acid ester is formed with opening of the epoxide ring. After four hours, the acetone solution is poured into 500 parts of water. The reaction product, which separates in the form of a viscous mass, is then dissolved in 50 parts of hydrobromic acid (d.=1.51). This solution is left standing at 0° C. for some days. The hydrobromide thereby crystallizes out. It is filtered off by suction and washed with a little ice-cold water.

43 parts of the dry hydrobromide and 20 parts of hydrochloric acid (d.=1.15) are dissolved in 100 parts of water and diazotized by adding a solution of 6.9 parts of sodium nitrite in 20 parts of water. The diazo solution thus obtained is coupled at 5° to 10° C. with a solution of 22.4 parts of 1-hydroxynaphthalene-4-sulfonic acid, 4 parts of sodium hydroxide and 17.2 parts of sodium carbonate in 370 parts of water. After the coupling is complete, the pH value of the solution is first brought to 6 to 7 by the addition of concentrated acetic acid and then the dyestuff is filtered off by suction and dried at 50° C. in vacuo. The dyestuff gives on cotton, after fixation with alkaline reagents, brilliant red dyeings with very good wet fastness properties and, in the form of the free acid, has the following constitution:

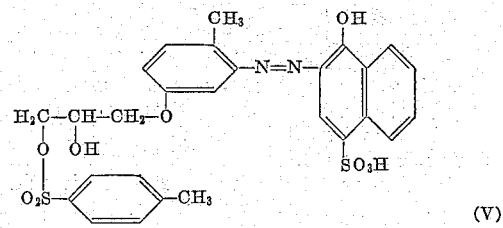

Example 2

21 parts of the 2,3-epoxypropyl-(3-formylamino-4-methylphenyl) ether obtainable according to the first paragraph of Example 1 are suspended in 100 parts of acetone. 10 parts of methylsulfonic acid are added to the suspension and the mixture is stirred for another hour. The acetone is then removed by distillation in vacuo and the remaining syrupy mass is dissolved in 50 parts of aqueous hydrochloric acid (d.=1.195) while cooling. After allowing to stand for 3 hours, the solution is diluted with 75 parts of water, 75 parts of ice are introduced and diazotisation effected by addition of a solution of 6.9 parts of sodium nitrite in 20 parts of water. The diazo solution thus obtained is then allowed to flow at 5° to 10° C. into a solution of 22.4 parts of 2-hydroxynaphthalene-6-sulfonic acid, 4 parts of sodium hydroxide and 26,5 parts of sodium carbonate in 200 parts of water. After the coupling has ended, the pH value of the mixture is brought to 6 to 7 by addition of a little acetic acid. The dystuff formed is filtered off by suction and dried at 50° C. in vacuo. The dyestuff gives on cotton, after fixation with alkaline reagents, scarlet-red dyeings with very good wet fastness properties. In the form of the free acid, the dyestuff is constituted as follows:

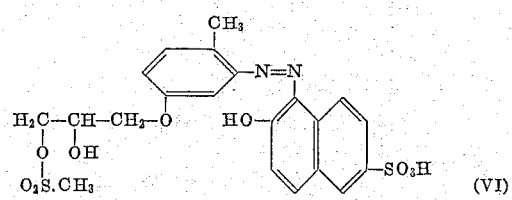

Example 3

110 parts of the 2,3-epoxypropyl-(3-formylamino-4-methylphenyl) ether obtainable according to the first paragraph of Example 1 are stirred at 10° to 20° C. into 500 parts of concentrated sulfuric acid. After the ether has completely dissolved, the solution is poured onto 600 parts of ice, the mixture stirred for 15 hours and then cooled to −25° C. There thus separates as a sticky mass on the walls of the vessel the beta,gamma-dihydroxy-propyl-(3-amino-4-methylphenyl) ether esterified in gamma-position with sulfuric acid. The supernatant aqueous solution is poured off and the reaction product is stirred with 500 parts of ethanol until it has acquired a granular nature. The material is then filtered off by suction and dried in vacuo in the presence of calcium chloride.

14 parts of the beta-gamma-dihydroxypropyl-(3-amino-4-methylphenyl) ether esterified in gamma-position with sulfuric acid and 7.5 parts of aqueous hydrochloric acid (d.=1.16) are dissolved in 50 parts of water. Diazotisation is then carried out by adding a solution of 3.5 parts of sodium nitrite in 10 parts of water. The diazo solution obtained is then allowed to flow into a solution of 11.2 parts of 1-hydroxynaphthalene-5-sulfonic acid, 4 parts of sodium hydroxide and 12 parts of sodium carbonate in 100 parts of water. When the coupling has ended, the pH value of the reaction mixture is brought to 6 to 7 by means of acetic acid. Then the dyestuff is deposited by adding sodium chloride, filtered off by suction and dried in vacuo at 50° C. The new dyestuff, which dyes fabric of cotton, after fixation with alkaline reagents, dark red shades of very good fastness properties, has the following structure:

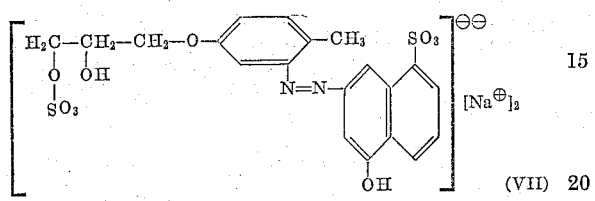

(VII)

Two further examples are contained in the following table:

| Example No. | Diazo component | Coupling component | Shade |
|---|---|---|---|
| 4 | ![diazo with CH3, NH2, CH2-CH-CH2-O, OH, SO2, naphthalene] | ![OH naphthalene with SO3H] | Red. |
| 5 | ![diazo with CH3, NH2, CH2-CH-CH2-O, OH, SO2, biphenyl-SO2] | 2 mols ![OH naphthalene with SO3H] | Do. |
| | | ![CH3, NH2 phenyl with O-CH2-CH-CH2-O, OH, SO2] | |

Example 6

41.5 parts of the formula:

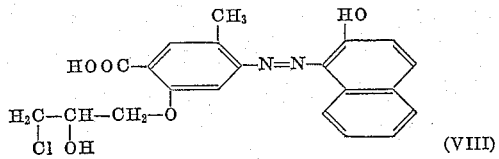

(VIII)

obtainable by coupling diazotized 2-carboxy-4-methyl-5-aminophenyl-(beta-hydroxy-gamma-chlorpropyl) ether with 2-hydroxy-naphthalene in weak alkaline solution are introduced into 300 parts of anhydrous dioxane and stirred at room temperature with 18 parts of finely ground potassium hydroxide. The mixture is stirred for 15 hours, the solution separated from deposited potassium chloride and allowed to flow while stirring into a mixture of 500 parts of ice and 500 parts of water. The monoazo dyestuff containing a beta,gamma-epoxypropyl radical instead of the beta-hydroxy-gamma-chlorpropyl radical thereby precipitated must be worked up immediately. For this purpose it is filtered off by suction and the filtered material introduced in small portions while stirring continually into a well-cooled mixture of 100 parts of concentrated sulfuric acid and 50 parts of ice. The reaction mixture is then stirred at 10° C. until the dyestuff has passed completely into solution and it is then neutralized at 0° to +5° C. by means of potassium carbonate. The reaction product is then salted out by introducing potassium sulfate into the solution. The dyestuff thus obtained has the formula:

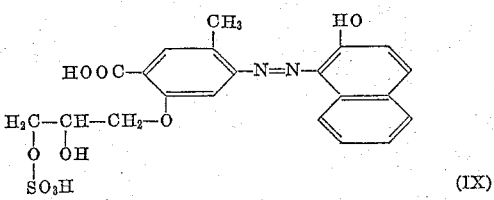

(IX)

(in the form of the free acid). It dyes cotton fabric, after fixation with alkaline reagents, orange-red shades with good wet fastness properties.

Example 7

183 parts of 4-aminophenyl-(beta,gamma-dihydroxypropyl) ether are dissolved together with 100 parts of concentrated sulfuric acid in 100 parts of water. This solution is first evaporated in vacuo at about 20 mm. mercury column until it has acquired an oily nature and then heated in vacuo at about 20 mm. mercury column for 15 hours at 120° C. The 4-aminophenyl-(beta,gamma-dihydroxypropyl) ether esterified in gamma-position with sulfuric acid is thus obtained in the form of a hard mass with the acid number 243 which is readily soluble in water.

Into a solution of 30 parts of the sulfuric acid ester obtainable as in the preceding paragraph in 100 parts of water there are introduced 20 parts of aqueous hydrochloric acid (d.=1.16) and diazotisation is effected at 0° to +5° C. by adding a solution of 6.9 parts of sodium nitrite in 20 parts of water. The diazo solution thus obtained is combined at 5 to 10° C. with a solution of 25.5 parts of 1-(3-sulfophenyl)-3-methyl-pyrazolone-(5), 4 parts of sodium hydroxide and 10.6 parts of sodium carbonate in 100 parts of water. After the coupling has ended, the dyestuff is deposited by adding sodium chloride, filtered off by suction and dried at 50° C. in vacuo.

The dyestuff has the following constitution:

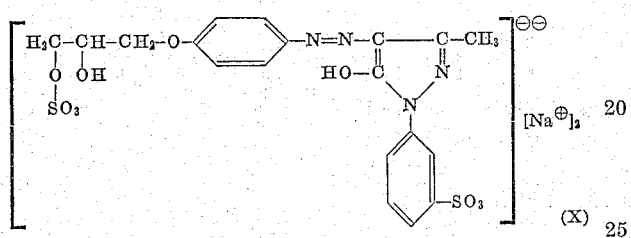

On cotton, after fixation with alkaline reagents, it gives brilliant yellow dyeings with very good wet fastness properties.

*Example 8*

11 parts of chlorsulfonic acid are stirred in small portions at 0° to +5° C. into a solution of 16.3 parts of 4-aminophenyl-(beta,gamma-dihydroxypropyl) ether in 100 parts of anhydrous N-methylpyrrolidone and the reaction mixture is stirred for another 2 hours at this temperature. Then a mixture of 100 parts of water and 20 parts of aqueous hydrochloric acid (d.=1.16) is introduced into the mixture and diazotisation effected at 0° to +5° C. by adding a solution of 6.9 parts of sodium nitrite in 20 parts of water. The diazo solution thus obtained is coupled at 5° to 10° C. with a solution of 22.4 parts of 1-hydroxynaphthalene-4-sulfonic acid, 8 parts of sodium hydroxide and 22 parts of sodium carbonate in 200 parts of water. After the coupling is completed, the dyestuff solution is poured into a solution of 600 parts of sodium chloride in 2000 parts of water. The deposited dyestuff is filtered off by suction and dried at 50° C. in vacuo. It has the following constitution:

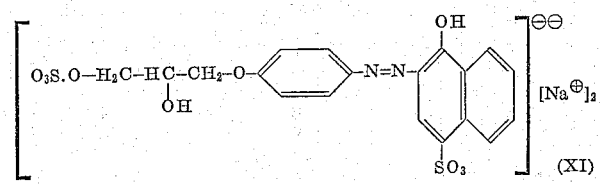

The dyestuff dyes staple fabric, after fixation with alkaline reagents, brilliant red shades with very good wet fastness properties.

*Example 9*

16 parts of a solution which has been previously prepared from 116 parts of chlorsulfonic acid and 500 parts of anhydrous dioxane are added in small portions at 0° to +10° C. to a solution in 50 parts of pyridine of 3.5 parts of the azo dyestuff obtainable by coupling diazotized 3-aminophenyl-(beta,gamma-dihydroxypropyl) ether with 2-hydroxynaphthalene. The reaction mixture is then stirred for another 2 hours and then poured into a solution of 80 parts of sodium chloride in 250 parts of water. Care is taken by adding aqueous hydrochloric acid that the mixture constantly has an acid reaction.

The deposited organic phase of the mixture is then separated, the aqueous phase allowed to stand for about 15 hours and the dyestuff then filtered off by suction therefrom. The dyestuff, in the form of the free acid, has the following structure:

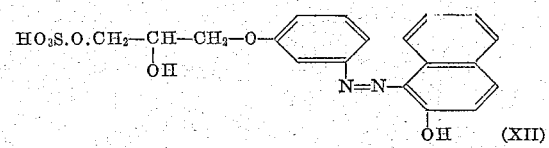

With the new dyestuff there are obtained on cotton yarn, after fixation with alkaline reagents, orange dyeings with very good wet fastness properties.

*Example 10*

225 parts of 3-acetylaminophenyl-(beta,gamma-dihydroxypropyl) ether are introduced while stirring into a solution of 100 parts of concentrated sulfuric acid in 400 parts of water. The suspension is then heated to boiling point. The ether thereby gradually passes into solution. The solution is thereafter boiled for another 3 hours under reflux and evaporated under reduced pressure until it has an oily nature. The reaction product is heated in vacuo at about 15 mm. mercury column at 120° C. for 15 hours. The material thereby becomes very viscous. It solidifies to a vitreous mass upon cooling. The 3-aminophenyl-(beta,gamma-dihydroxypropyl) ether esterified in gamma-position with sulfuric acid has the acid number 248.

Into a solution of 30 parts of the sulfuric acid ester obtainable as described in the preceding paragraph in 100 parts of water there are introduced 20 parts of aqueous hydrochloric acid (d.=1.16). It is then diazotized by adding at 0° to +5° C. a solution of 6.9 parts of sodium nitrite in 20 parts of water. The diazo solution thus obtained is coupled at 5° to 10° C. with a solution of 25.5 parts of 1-(3-sulfophenyl)-3-methylpyrazolone-(5), 4 parts of sodium hydroxide and 10.6 parts of sodium carbonate in 100 parts of water. After the coupling is ended, the dyestuff is deposited by adding sodium chloride, filtered off by suction and dried at 50° C. in vacuo. The dyestuff, which dyes cotton, after fixation with alkaline reagents, brilliant yellow shades of very good wet fastness properties, has the following structure:

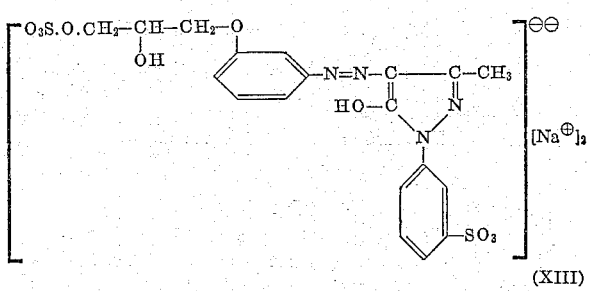

If in the second paragraph of this example there is used, instead of 3-aminophenyl-(beta,gamma-dihydroxypropyl) ether esterified with sulfuric acid in gamma-position, the corresponding amount of the gamma-sulfuric acid ester of 3-amino-6-chlorphenyl-(beta, gamma-dihydroxypropyl) ether, of 3-amino-4,6-dichlorphenyl-(beta,gamma-dihydroxypropyl) ether or of 3-ether or of 3-amino-4-methylphenyl-(beta,gamma-dihydroxypropyl) ether, yellow dyestuffs are obtained which dye cotton in somewhat redder shades than the azo dyestuff described in said second paragraph.

The monoazo dyestuffs obtainable starting from the diazo components and coupling components set out in the following table give, after fixation with alkaline reagents, dyeings on textile materials of cotton of the shades given in the table:

| Example No. | Diazo component | Coupling component | Shade |
|---|---|---|---|
| 11 | $CH_2$—CH—$CH_2$—O—C$_6$H$_4$—$NH_2$, with O—$SO_3H$ and OH on middle carbons | 2-naphthol (OH on naphthalene) | Orange. |
| 12 | same diazo as above | 1-hydroxy-naphthalene-2-sulfonic acid (OH, $SO_3H$) | Red. |
| 13 | same diazo | $HO_3S$—naphthalene—OH | Do. |
| 14 | same diazo | $H_2N$—, OH, $SO_3H$ naphthalene | Do. |
| 15 | same diazo | $CH_3$·CO—HN—naphthalene with OH and $SO_3H$ | Do. |
| 16 | same diazo | $CH_3$·CO·HN—, OH, $SO_3H$, $SO_3H$ naphthalene | Violet. |
| 17 | same diazo | 2-hydroxynaphthalene-3-(CONH—C$_6$H$_4$—$SO_3H$) | Red. |
| 18 | same diazo | $CH_3$—CO—$CH_2$—CONH—C$_6$H$_5$ | Yellow. |
| 19 | same diazo | 1-(4'-sulfophenyl)-3-methyl-5-pyrazolone | Do. |
| 20 | $CH_2$—CH—$CH_2$—O—C$_6$H$_4$—$NH_2$ (meta), with O—$SO_3H$, OH | 2-naphthol | Orange. |
| 21 | same as 20 (meta-amino) | 1-hydroxy-naphthalene-4-sulfonic acid | Red. |

| Example No. | Diazo component | Coupling component | Shade |
|---|---|---|---|
| 22 | CH₂—CH—CH₂—O—C₆H₄—NH₂, with O, OH, SO₃H on propyl chain | 7-amino-1-hydroxy-naphthalene-3-sulfonic acid (H₂N, OH, SO₃H on naphthalene) | Red. |
| 23 | CH₂—CH—CH₂—O—C₆H₄—NH₂, with O, OH, SO₃H | 7-acetamido-1-hydroxy-naphthalene-3-sulfonic acid (CH₃·CO·HN, OH, SO₃H) | Do. |
| 24 | CH₂—CH—CH₂—O—C₆H₄—NH₂, with O, OH, SO₃H | 8-acetamido-1-hydroxy-naphthalene-3,6-disulfonic acid (CH₃·CO·HN, OH, SO₃H, SO₃H) | Bluish-red. |
| 25 | CH₂—CH—CH₂—O—C₆H₄—NH₂, with O, OH, SO₃H | 3-hydroxy-2-naphthoyl-aminobenzene-4-sulfonic acid (naphthalene-OH—CONH—C₆H₄—SO₃H) | Red. |
| 26 | CH₂—CH—CH₂—O—C₆H₄—NH₂, with O, OH, SO₃H | CH₃—CO—CH₂—CO—NH—C₆H₅ | Yellow. |
| 27 | CH₂—CH—CH₂—O—C₆H₄—NH₂, with O, OH, SO₃H | 1-(4-sulfophenyl)-3-methyl-5-pyrazolone (HO—C=CH—C(CH₃)=N—N—C₆H₄—SO₃H) | Do. |
| 28 | CH₂—CH—CH₂—O—C₆H₃(NH₂)—, with O, OH, SO₃H (aminophenyl ortho substituted) | 1-hydroxy-naphthalene-4-sulfonic acid (OH, SO₃H) | Red. |
| 29 | CH₂—CH—CH₂—O—C₆H₃(NH₂)(CH₃), with O, OH, SO₃H | 1-hydroxy-naphthalene-4-sulfonic acid | Do. |
| 30 | CH₂—CH—CH₂—O—C₆H₃(Cl)(NH₂), with O, OH, SO₃H | 1-hydroxy-naphthalene-4-sulfonic acid | Do. |
| 31 | CH₂—CH—CH₂—O—C₆H₂(Cl)(NH₂)(Cl), with O, OH, SO₃H | 1-hydroxy-naphthalene-4-sulfonic acid | Do. |
| 32 | CH₂—CH—CH₂—O—C₆H₃(OCH₃)(NH₂), with O, OH, SO₃H | 1-hydroxy-naphthalene-4-sulfonic acid | Do. |

| Example No. | Diazo component | Coupling component | Shade |
|---|---|---|---|
| 33 | CH₂—CH—CH₂—O—C₆H₃(OCH₃)—NH₂ with O—SO₃H, OH on chain | 1-naphthol-4-sulfonic acid (OH, SO₃H) | Red. |
| 34 | CH₂—CH—CH₂—O—C₆H₃(SO₂CH₃)—NH₂ with O—SO₃H, OH | 1-naphthol-4-sulfonic acid | Do. |
| 35 | CH₂—CH—CH₂—O—C₆H₃(H₂N)(NO₂) with O—SO₃H, OH | 1-naphthol-4-sulfonic acid | Violet. |
| 36 | CH₂—CH—CH₂—O—C₆H₄—NH₂ with O—SO₂—C₆H₄—CH₃, OH | 1-naphthol-4-sulfonic acid | Red. |
| 37 | CH₂—CH—CH₂—O—C₆H₄—NH₂ with O—SO₂—C₆H₄—CH₃, OH | 1-naphthol-4-sulfonic acid | Do. |
| 38 | CH₂—CH—CH₂—O—C₆H₄—NH₂ with O—SO₃H, OH | C₆H₅—CO·HN—naphthol disulfonic acid (OH, 2 SO₃H) | Violet. |
| 39 | CH₂—CH—CH₂—O—C₆H₄(NH₂) with O—SO₃H, OH | C₆H₅—CO·HN—naphthol disulfonic acid | Bluish-red. |
| 40 | CH₂—CH—CH₂—O—C₆H₄—NH₂ with O—SO₃H, OH | C₆H₅—CO·HN—naphthol-SO₃H (OH) | Red. |
| 41 | CH₂—CH—CH₂—O—C₆H₄(NH₂) with O—SO₃H, OH | C₆H₅—CO·HN—naphthol-SO₃H (OH) | Do. |
| 42 | CH₂—CH—CH₂—O—C₆H₄(NH₂) with O—SO₂·CH=CH₂, OH | pyrazolone: CH—C—CH₃, HO—C, N, N—C₆H₃(Cl)(CH₃)(SO₃H) | Yellow. |

| Example No. | Diazo component | Coupling component | Shade |
|---|---|---|---|
| 43 | CH₂—CH—CH₂—O—C₆H₄—NH₂, with O—SO₂—C₆H₅ | Pyrazolone: CH=C—CH₃, HO—C, N—N-phenyl(Cl, CH₃, SO₃H) | Yellow. |
| 44 | CH₂—CH—CH₂—O—C₆H₄—NH₂, with O—, OH, SO₂·CH₂·CHCl | 1-Naphthol-SO₃H (OH, SO₃H) | Red. |
| 45 | CH₂—CH—CH₂—O—C₆H₄—NH₂, with O—, OH, SO₂—C₆H₄—Cl | Pyrazolone: CH=C—CH₃, HO—C, N—N-phenyl(Cl, HO₃S) | Yellow. |
| 46 | CH₂—CH—CH₂—O—C₆H₃(NH₂)—, with O—, OH, SO₂—C₆H₄—NO₂ | 1-Naphthol-SO₃H (OH, SO₃H) | Red. |
| 47 | CH₂—CH—CH₂—C₆H₃(NH₂)—, with O—, OH, SO₂—C₆H₄—Cl | Pyrazolone: CH=C—CH₃, HO—C, N—N-phenyl(Cl, HO₃S) | Yellow. |

Example 48

A solution of 17.3 parts of 4-aminobenzene sulfonic acid, 4 parts of sodium hydroxide and 6.9 parts of sodium nitrite in 50 parts of water is slowly stirred into a mixture of 30 parts of aqueous hydrochloric acid (d.=1.16) and 30 parts of ice. The suspension of diazotized 4-aminobenzene sulfonic acid thus obtained is then allowed to flow into a solution of 27 parts of the 3-aminophenyl-(beta,gamma-dihydroxypropyl) ether esterified with sulfuric acid in gamma-position obtainable according to paragraph 1 of Example 4 in 50 parts of water. The mixture is stirred for 15 minutes at 10° C., 10 parts of aqueous hydrochloric acid (d.=1.16) are added and diazotisation effected by adding a solution of 6.9 parts of sodium nitrite in 20 parts of water at 0° to +5° C. The diazo solution is then introduced into a solution of 25.4 parts of 1-(4-sulfophenyl)-3-methylpyrazolone-(5) and 42 parts of sodium carbonate in 100 parts of water. After coupling is ended, the pH value of the solution is brought to 5 to 6 by means of acetic acid and the disazo dyestuff salted out by adding 50 parts of potassium chloride. The deposited dyestuff is then filtered off by suction and dried in vacuo at 50° C. The new dyestuff dyes cotton fabric, after fixation with alkaline reagents, yellow shades of good wet fastness properties and has, in the form of the free acid, the following constitution:

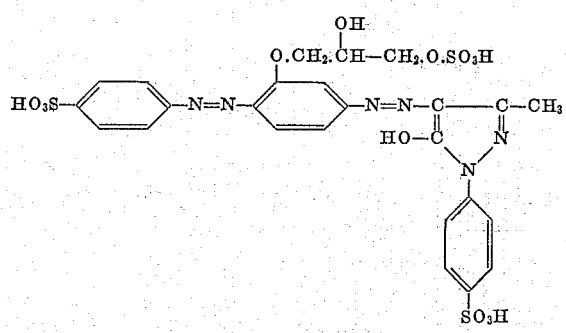

(XIV)

We claim:

1. A water-soluble azo dyestuff of the formula

B—SO₂—O—CH₂—CH(OH)—CH₂—O—D—N=N—E in which:

B represents a member selected from the class consisting of

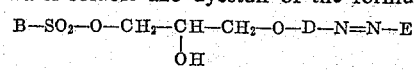

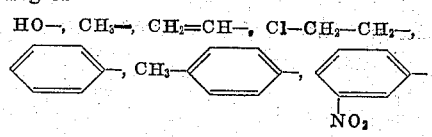

and 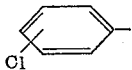

D represents a member selected from the class consisting of

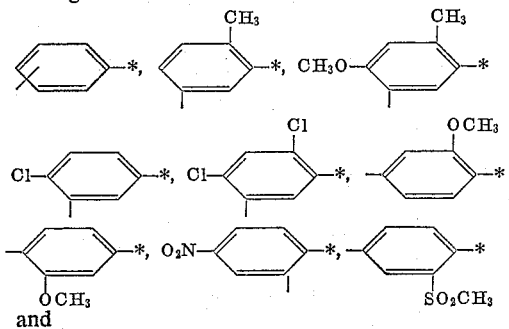

and the asterisk (*) indicating the position at which D is linked to the azo group (—N=N—); and E represents a coupling component selected from the class consisting of the naphthalene and pyrazolone series; said coupling component containing up to two aromatically-substituted water-solubilizing $SO_3H$ groups.

2. The dyestuff of the formula:

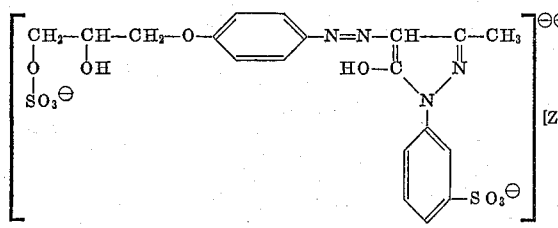

in which $Z^\oplus$ represents a cationic radical selected from the class consisting of hydrogen, ammonium and alkali metals.

3. The dyestuff of the formula:

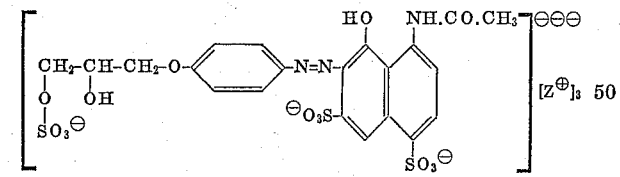

in which $Z^\oplus$ represents a cationic radical selected from the class consisting of hydrogen, ammonium and alkali metals.

4. The dyestuff of the formula:

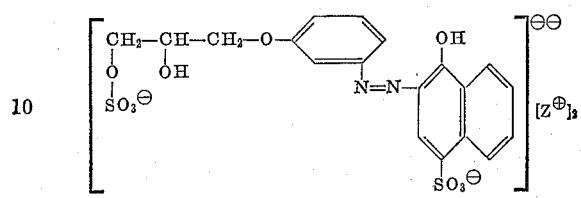

in which $Z^\oplus$ represents a cationic radical selected from the class consisting of hydrogen, ammonium and alkali metals.

5. The dyestuff of the formula:

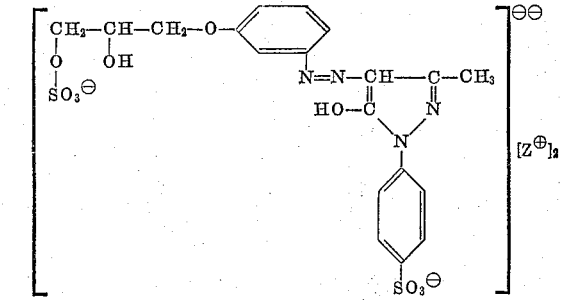

in which $Z^\oplus$ represents a cationic radical selected from the class consisting of hydrogen, ammonium and alkali metals.

References Cited in the file of this patent

UNITED STATES PATENTS

| | | |
|---|---|---|
| 1,483,084 | Green et al. | Feb. 12, 1924 |
| 1,935,624 | Ellis et al. | Nov. 21, 1933 |
| 2,195,390 | Ellis et al. | Mar. 26, 1940 |
| 2,307,921 | Dickey et al. | Jan. 12, 1943 |
| 2,323,314 | Dickey et al. | July 6, 1943 |
| 2,741,532 | Guthrie | Apr. 10, 1956 |
| 2,944,870 | Atkinson et al. | July 12, 1960 |

OTHER REFERENCES

Wegmann, J.; Textil-Praxis, October 1958, pages 1056–1061.